United States Patent
Mao

(10) Patent No.: US 7,456,128 B2
(45) Date of Patent: Nov. 25, 2008

(54) CATALYST FORMULATIONS FOR THE THERMO-CATALYTIC CRACKING OF NAPHTHAS AND GAS OILS

(75) Inventor: Raymond Le Van Mao, Saint-Laurent (CA)

(73) Assignee: Valorbec, S.E.C., Represented by The Gestion Valeo, S.E.C., Montreal, Quebec (CA)

( * ) Notice: Subject to any disclaimer, the term of this patent is extended or adjusted under 35 U.S.C. 154(b) by 637 days.

(21) Appl. No.: 11/118,095

(22) Filed: Apr. 29, 2005

(65) Prior Publication Data

US 2005/0277544 A1    Dec. 15, 2005

Related U.S. Application Data

(60) Provisional application No. 60/566,081, filed on Apr. 29, 2004.

(51) Int. Cl.
| | |
|---|---|
| *B01J 27/02* | (2006.01) |
| *B01J 27/06* | (2006.01) |
| *B01J 27/14* | (2006.01) |
| *B01J 27/132* | (2006.01) |
| *B01J 27/186* | (2006.01) |

(52) U.S. Cl. .................. 502/208; 502/60; 502/63; 502/64; 502/65; 502/68; 502/73; 502/302; 502/303; 502/304; 502/211; 502/210; 502/216; 502/219; 502/220; 502/224; 502/228

(58) Field of Classification Search ............ 502/60, 502/63, 64, 65, 68, 73, 302, 303, 304, 208, 502/211, 210, 216, 219, 220, 224, 228
See application file for complete search history.

(56) References Cited

U.S. PATENT DOCUMENTS 4,732,881 A    3/1988    Le Van Mao

FOREIGN PATENT DOCUMENTS

| CA | 2384884 | 2/2002 |
|---|---|---|
| WO | WO 01/32806 | 5/2001 |
| WO | WO 02/10313 | 2/2002 |
| WO | WO 03/064039 | 8/2003 |

OTHER PUBLICATIONS

Le Van Mao, R. et al., J. Mater. Chem., 1992, vol. 2(6), pp. 595-599.
Le Van Mao, R. et al., Catalysis Letters, 2001, vol. 73, No. 2-4, pp. 181-186.
Melançon, S. et al., Catalysis Letters, 2002, vol. 80, No. 3-4, pp. 103-109.
Raseev, Serge, Thermal and Catalytic Processes in Petroleum Refining, 2003, Chapter 4 and 5, pp. 137-274.
Xiao, S. et al., J. Mater. Chem., 1995, vol. 5(8), pp. 1251-1255.

*Primary Examiner*—Elizabeth D Wood
(74) *Attorney, Agent, or Firm*—Fulbright & Jaworski L.L.P.

(57) ABSTRACT

Disclosed herein are cracking catalysts useful in the thermo-catalytic cracking (TCC)—formerly called selective deep catalytic cracking (SDCC)—of petroleum naphthas, gas oils and other heavy hydrocarbon distillates to selectively produce light olefins, said catalyst comprising mesoporous mixed oxides modified by the presence of inorganic compounds containing chemical elements selected from phosphorus, sulfur, chlorine and mixtures thereof, said catalyst being supported on yttria stabilized zirconium oxide and/or aluminum oxide. Preferably, the catalyst will have the the following formula:

(*a*) $MoO_3$ and/or $WO_3$; (*b*) $La_2O_3$; (*c*) $CeO_2$; (*d*) P, S or Cl; (*e*) $ZrO_2$; (*f*) $Y_2O_3$.

Also preferably, the catalyst will be combined with a material selected from an acidic crystalline (modified or not) zeolite, an acidic silica molecular sieve and an acidic alumina. Also disclosed are methods of making said cracking catalysts. The cracking catalysts can be used in both mono- and dual reactor configurations. Furthermore, the catalysts of the present invention have a sufficiently high thermal (and steam atmosphere) resistance, enabling them to be used at significantly higher temperatures.

31 Claims, No Drawings

CATALYST FORMULATIONS FOR THE THERMO-CATALYTIC CRACKING OF NAPHTHAS AND GAS OILS

CROSS-REFERENCE(S) TO RELATED APPLICATION(S)

This application claims the benefit of U.S. Provisional Patent Application No. 60/566,081, filed Apr. 29, 2004, the entire contents of which are expressly incorporated by reference.

FIELD OF THE INVENTION

The present invention relates to catalyst formulations that are used in the thermo-catalytic cracking of naphthas and gas oils.

BACKGROUND OF THE INVENTION

Steam-cracking or pyrolysis of hydrocarbons is one of the core processes in the petrochemical industry [S. Raseev; "Thermal and Catalytic Processes in Petroleum Refining", Marcel Dekker Inc., New York (2003), p137-274]. Current world production of steam-cracking products is estimated to be more than 100 million metric tons/year of ethylene and propylene.

Basically, steam-cracking comprises a step in which the hydrocarbon mixture to be transformed is mixed with steam and submitted to elevated temperatures in a tubular reactor. The reaction temperature usually ranges from about 700 to about 1000° C. according to the type of feedstock treated (the longer the hydrocarbon molecular structure, the lower the required temperature for cracking), while the residence time ranges from a fraction of second to a few seconds. The different resulting products, gaseous or liquid, are then collected and separated. The product distribution depends on both the nature of the initial hydrocarbon mixture and the reaction conditions.

During steam-cracking, light paraffins such as ethane, propane and butane (obtained mainly by extraction from various natural gas sources), as well as naphthas and other heavier petroleum cuts, are broken down (cracked) into mainly:

1) light olefins, primarily ethylene and propylene;
2) depending on the feedstock employed, a $C_4$ cut rich in butadienes and a $C_5^+$ cut with a high content of aromatics, particularly benzene; and
3) hydrogen.

Since enormous quantities of hydrocarbons are steam-cracked throughout the world, even modest yield or product selectivity improvements may lead to substantial commercial advantages.

A method for upgrading the products of propane steam-cracking has been previously developed [R. Le Van Mao, U.S. Pat. No. 4,732,881]. This process comprises adding a small catalytic reactor to a conventional propane steam-cracker. The catalysts used were based on hybrid zeolite catalysts, namely a ZSM-5 zeolite modified with Al and Cr. Significant increases in the yield of ethylene and aromatics were obtained.

A further refined steam-cracking process has been previously described [R. Le Van Mao, S. Melancon, C. Gauthier-Campbell and P. Kletnieks; Catal. Lett. 73 (2/4) (2001) 181; R. Le Van Mao, PCT/CA00/01327] (WO0132806). The process comprises the use of a tubular reactor with two heating zones positioned at the two ends of the reactor (referred to as a "dual" reactor). The first heating zone (I) is empty or contains a robust solid material which acts primarily as a heat transfer medium. The second heating zone (II) is charged with a ZSM-5 zeolite based catalyst, preferably of the hybrid configuration (i.e. at least two co-catalysts are commingled). Variations in the temperature of heating zone I versus heating zone II, as well as the textural properties and/or the surface composition of the catalyst of zone (II), were used to increase the conversion and to vary the product distribution, namely the ethylene/propylene ratio.

New steam cracking-catalysts requiring a simpler reactor technology (i.e. a single heating zone reactor or a "mono reactor") have also been disclosed [R. Le Van Mao, PCT/CA01/01107 (WO 02/10313); S. Melancon, R. Le Van Mao, P. Klenieks, D. Ohayon, S. Intem, M. A. Saberi, and D. McCann, Catal. Lett. 80 (3/4), (2002), 103]. More specifically, mono-component and hybrid catalyst compositions for use in the cracking of hydrocarbon feeds are disclosed. The catalyst compositions comprise oxides of aluminum, silicon, chromium, and optionally, oxides of monovalent alkaline metals.

New and improved versions of catalysts for the selective deep catalytic cracking process comprising molybdenum or tungsten oxides and cerium oxide, supported on zirconium oxide, were described in International Application PCT/CA03/00105 (WO03064039).

There thus remains a need to develop selective and thermally stable cracking catalysts that can be used in both mono- and dual reactor configurations.

The present invention seeks to meet these and other needs.

SUMMARY OF THE INVENTION

In broad terms, the present invention relates to cracking catalysts that can be used in both mono- and dual reactor configurations comprising molybdenum/tungsten; lanthanum; cerium; phosphorus, sulfur or chloride; supported on yttria stabilized zirconium oxide and/or aluminum oxide. More specifically, the present invention relates to cracking catalysts comprising molybdenum and phosphorus or chloride, supported on yttria stabilized zirconium oxide and/or aluminum oxide.

The present invention relates to mono-component as well as to hybrid catalysts for use in the steam-cracking of hydrocarbon feeds to selectively produce light olefins. In a first embodiment, the present invention relates to mono-component catalysts comprising mesoporous mixed oxides of zirconium (and/or aluminum), yttrium, molybdenum and optionally wolfram (tungsten); phosphorus, sulfur or chlorine; cerium and/or lanthanum. In a second embodiment, the present invention relates to hybrid catalysts comprising mesoporous mixed oxides of zirconium (and/or aluminum), yttrium, molybdenum and optionally wolfram (tungsten), intimately bound to microporous or mesoporous materials containing silica and/or alumina.

In general terms, the catalysts comprising mesoporous mixed oxides will have the following composition:

(a) $MoO_3$ and/or $WO_3$; (b) $La_2O_3$; (c) $CeO_2$; (d) P, S or Cl; (e) $ZrO_2$ and/or $Al_2O_3$; (f) $Y_2O_3$.

In a preferred embodiment, the present invention relates to catalysts comprising mesoporous mixed oxides including the following oxide composition (based on the total weight of the mixed oxide component):

| (a) MoO₃ and/or WO₃: | 3.0 to 15.0 wt %; |
|---|---|
| (b) La₂O₃: | 0.0 to 7.0 wt %; |
| (c) CeO₂: | 0.0 to 3.0 wt %; |
| (d) P, S or Cl: | 0.0 to 2.0 wt %; |
| (e) ZrO₂ and/or Al₂O₃: | 70.0 to 90.0 wt %; and |
| (f) Y₂O₃: | 3.0 to 20 wt %. |

In a most preferred embodiment, the catalyst of the present invention, as described above in terms of general formula or composition, is mounted on or otherwise combined with an acidic crystalline (modified or not) zeolite, an acidic silica molecular sieve or an acidic alumina. In a most preferred embodiment, this combination is facilitated by admixing with a binder such as bentonite clay.

Additionally, the present invention relates to methods of making the catalysts of the present invention.

Further scope of applicability of the present invention will become apparent from the detailed description given hereinafter. It should be understood, however, that this detailed description, while indicating preferred embodiments of the invention, is given by way of illustration only, since various changes and modifications within the spirit of the invention will become apparent to those skilled in the art.

DETAILED DESCRIPTION OF THE INVENTION

The present invention relates to catalyst formulations that can be used in both mono- and dual reactor configurations, the catalyst formulations comprising molybdenum/tungsten; lanthanum; cerium; phosphorus, sulfur or chloride; supported on yttria stabilized zirconium oxide and/or aluminum oxide. These catalysts are so active, selective and thermally stable that they can be used in both the "mono" and "dual" reactor configurations.

A "dual" reactor configuration comprises two sequential reaction zones: a first for thermal cracking, and a second for catalytic conversion. The second zone can host catalysts containing zeolite-like materials. Thus, the operating temperatures of the second zone have to be relatively low in order to maintain the structural stability of these zeolite-like materials.

A "mono" reactor configuration comprises only one reaction zone: the catalyst bed. Therefore, with the "mono" reactor configuration, the catalytic operation can be carried out in a fixed bed or a fluidized bed reactor. The "mono" reactor configuration responds to a need for a simplified cracking technology while simultaneously maintaining superior catalyst performance and product flexibility to what is currently achieved with conventional steam-cracking processes.

1. Catalyst Preparation

EXAMPLE 1

Catalyst DC-25/1

Two solutions were first prepared as follows:
Solution A: Ammonium molybdate tetrahydrate (9.1 g) was dissolved in warm distilled water (25 mL).
Solution B: Lanthanum nitrate hydrate (3.3 g) was dissolved in distilled water (5 mL).
Solution B was added to solution A over a period of about 5 minutes while stirring vigorously, to provide a milky suspension. Yttria-stabilized zirconium oxide (49.9 g; zirconium (IV) oxide, 10-15 wt % of yttria from Strem Chemicals) was then added to the milky suspension over a period of about 3 to 5 minutes while stirring. The resulting suspension was left to settle at room temperature and then slowly evaporated in air at a temperature ranging from about 60-80° C. The solid obtained was crushed to a fine powder and then dried overnight at 120° C. The material, following activation in air at 550° C. for 3 hours, was named Molaziras (11). Extrusion of Molaziras (11) (11.9 g) with bentonite clay (2.1 g), [R. Le Van Mao, S. Melancon, C. Gauthier-Campbell and P. Kletnieks, Catal. Lett. 73 (2/4) (2001) 181; R. Le Van Mao, PCT/CA00/01327] (WO0132806, the disclosure of which is incorporated herein by reference thereto), provided the desired catalyst DC-25/1. The resulting extrudates were dried overnight at 120° C. and activated in air at 750° C. for 3 hours.

EXAMPLE 2

Catalyst DC-25/2

Molaziras (11) (8.4 g) obtained from example 1 above was thoroughly admixed with acidic alumina (3.5 g; alumina oxide, activated, acidic, Brockmann I, powder), followed by the addition of bentonite (2.1 g). The solid mixture was thoroughly homogenized and extruded. The final catalyst extrudates were dried overnight at 120° C. and activated in air at 650° C. for 3 hours.

EXAMPLE 3

Catalyst DC-25/3

Molaziras (11) (8.4 g) obtained from example 1 was thoroughly admixed with USY zeolite (3.5 g; H-form, Zeocat, Chemie Uetikon, powder), followed by the addition of bentonite (2.1 g). The solid mixture was thoroughly homogenized and extruded. The final catalyst extrudates were dried overnight at 120° C. and activated in air at 650° C. for 3 hours.

EXAMPLE 4

Catalyst DC-25/4

Molaziras (11) (8.4 g) obtained from example 1 was thoroughly admixed with dealuminated CaA zeolite (3.5 g) (prepared in accordance with the method using ammonium fluorosilicate, R. Le Van Mao, N. T. C. Vo, B. Sjiariel, L. Lee and G. Denes, J. Mater. Chem. 2 (6), (1992), 595, the disclosure of which is incorporated herein by reference thereto), followed by the addition of bentonite (2.1 g). The solid mixture was thoroughly homogenized and extruded. The final catalyst extrudates were dried overnight at 120° C. and activated in air at 650° C. for 3 hours.

EXAMPLE 5

Catalyst DC-25/5

Molaziras (11) (8.4 g) obtained from example 1 was thoroughly admixed with La-dealuminated X zeolite (3.5 g) (S. Xiao, R. Le Van Mao and G. Denes, J. Mater. Chem. 5(8), (1995), 1251) the disclosure of which is incorporated herein by reference thereto, followed by the addition of bentonite (2.1 g). The solid mixture was thoroughly homogenized and extruded. The final catalyst extrudates were dried overnight at 120° C. and activated in air at 650° C. for 3 hours.

EXAMPLE 6

Catalyst DC-25/6

Two solutions were first prepared as follows:
Solution A: Ammonium molybdate tetrahydrate (12.2 g) was dissolved in warm distilled water (25 mL).
Solution B: Lanthanum nitrate hydrate (5.0 g) was dissolved in distilled water (5 mL).
Solution B was added to solution A over a period of about 5 minutes while stirring vigorously, to provide a milky suspension. Yttria-stabilized zirconium oxide (49.9 g; zirconium (IV) oxide, 10-15 wt % of yttria from Strem Chemicals) was then added to the milky suspension over a period of about 3 to 5 minutes while stirring. The resulting suspension was left to settle at room temperature and then slowly evaporated in air at a temperature ranging from about 60-80° C. The solid obtained was crushed to a fine powder and then dried overnight at 120° C. The material, following activation in air at 550° C. for 3 hours, was named Molaziras (12). Extrusion of Molaziras (12) (11.9 g) with bentonite clay (2.1 g), [R. Le Van Mao, S. Melancon, C. Gauthier-Campbell and P. Kletnieks, Catal. Lett. 73 (2/4) (2001) 181; R. Le Van Mao, PCT/CA00/01327] (WO0132806), provided the desired catalyst DC-25/6. The resulting extrudates were dried overnight at 120° C. and activated in air at 750° C. for 3 hours.

EXAMPLE 7

Catalyst DC 27/7

Ammonium molybdate tetrahydrate (3.3 g) was dissolved in an aqueous solution of 0.25N $H_3PO_4$ (20 mL). To this solution was then added over a period of about 3 to 5 minutes, yttria-stabilized zirconium oxide (20.0 g; zirconium (IV) oxide, 5 wt % of yttria, precipitates, from Strem Chemicals) while stirring. The resulting suspension was left to settle at room temperature and then slowly evaporated in air at a temperature ranging from about 60-80° C. The solid obtained was crushed to a fine powder and then dried overnight at 120° C. The material, following activation in air at 550° C. was named Moziras (3). Extrusion of Moziras (3) (12.5 g) with bentonite clay (2.2 g), [R. Le Van Mao, S. Melancon, C. Gauthier-Campbell and P. Kletnieks, Catal. Lett. 73 (2/4) (2001) 181; R. Le Van Mao, PCT/CA00/01327] (WO0132806), provided the desired catalyst DC-27/7. The resulting extrudates were dried overnight at 120° C. and activated in air at 740° C. for 3 hours.

EXAMPLE 8

Catalyst DC 27/6

Ammonium molybdate tetrahydrate (3.3 g) was dissolved in an aqueous solution of 1.0N $H_3PO_4$ (20 mL). To this solution was then added over a period of about 3 to 5 minutes, yttria-stabilized zirconium oxide (20.0 g; zirconium (IV) oxide, 5 wt % of yttria, precipitates, from Strem Chemicals) while stirring. The resulting suspension was left to settle at room temperature and then slowly evaporated in air at a temperature ranging from about 60-80° C. The solid obtained was crushed to a fine powder and then dried overnight at 120° C. The material, following activation in air at 550° C., was named Moziras (1). Extrusion of Moziras (1) (12.5 g) with bentonite clay (2.2 g), [R. Le Van Mao, S. Melancon, C. Gauthier-Campbell and P. Kletnieks, Catal. Lett. 73 (2/4) (2001) 181; R. Le Van Mao, PCT/CA00/01327] (WO0132806), provided the desired catalyst DC-27/6. The resulting extrudates were dried overnight at 120° C. and activated in air at 740° C. for 3 hours.

EXAMPLE 9

Catalyst DC 27/9

Ammonium tetrahydrate (2.5 g) was dissolved in an aqueous solution (20 mL) containing phosphomolybdic acid (1.1 g). To this solution was then added over a period of 3 to 5 minutes, yttria-stabilized zirconium oxide (20.0 g; zirconium (IV) oxide, 5 wt % of yttria, precipitates, from Strem Chemicals) while stirring. The resulting suspension was left to settle at room temperature and then slowly evaporated in air at a temperature ranging from about 60-80° C. The solid obtained was crushed to fine powder and then dried overnight at 120° C. The material, following activation in air at 550° C., was named Moziras (6). Extrusion of Moziras (6) (12.5 g) with bentonite clay (2.2 g), [R. Le Van Mao, S. Melancon, C. Gauthier-Campbell and P. Kletnieks, Catal. Lett. 73 (2/4) (2001) 181; R. Le Van Mao, PCT/CA00/01327] (WO0132806), provided the desired catalyst DC-27/9. The resulting extrudates were dried overnight at 120° C. and activated in air at 740° C. for 3 hours.

EXAMPLE 10

Catalyst DC 27/10

Ammonium molybdate tetrahydrate (3.3 g) was dissolved in an aqueous solution of 1.0N $H_2SO_4$. (20 mL). To this solution was then added over a period of about 3 to 5 minutes, yttria-stabilized zirconium oxide (20.0 g; zirconium (IV) oxide, 5 wt % of yttria, precipitates, from Strem Chemicals) while stirring. The resulting suspension was left to settle at room temperature and then slowly evaporated in air at a temperature ranging from about 60-80° C. The solid obtained was crushed to a fine powder and then dried overnight at 120° C. The material, following activation in air at 550° C., was named Moziras (2). Extrusion of Moziras (2) (12.5 g) with bentonite clay (2.2 g), [R. Le Van Mao, S. Melancon, C. Gauthier-Campbell and P. Kletnieks, Catal. Lett. 73 (2/4) (2001) 181; R. Le Van Mao, PCT/CA00/01327], (WO0132806), provided the desired catalyst DC-27/10. The resulting extrudates were dried overnight at 120° C. and activated in air at 740° C. for 3 hours.

EXAMPLE 11

Catalyst DC 27/13

Ammonium molybdate tetrahydrate (3.3 g) was dissolved in an aqueous solution of 1.0 N HCl (20 mL). To this solution was then added over a period of about 3 to 5 minutes, yttria-stabilized zirconium oxide (20.0 g; zirconium (IV) oxide, 5 wt % of yttria, precipitates, from Strem Chemicals) while stirring. The resulting suspension was left to settle at room temperature and then slowly evaporated in air at a temperature ranging from 60-80° C. The solid obtained was crushed to a fine powder and then dried overnight at 120° C. The material, following activation in air at 550° C., was named Moziras (7). Extrusion of Moziras (7) (12.5 g) with bentonite clay (2.2 g), [R. Le Van Mao, S. Melancon, C. Gauthier-Campbell and P. Kletnieks, Catal. Lett. 73 (2/4) (2001) 181; R. Le Van Mao, PCT/CA00/01327] (WO0132806), provided the desired catalyst DC-27/10. The resulting extrudates were dried overnight at 120° C. and activated in air at 740° C. for 3 hours.

EXAMPLE 12

Catalyst DC 27/304b

The yttria-stabilized aerogel alumina, herein named Y—Al, was prepared using a procedure similar to that reported in ref. [E. Elalaoui, R. Begag, B. Pommier and G. M. Pajonk, in Studies in Surface Science and Catalysis 143, E. Gaigneaux et al. (Editors), Elsevier Science B.V., Amsterdam (2002)]. Solution A was prepared by dissolving 2.6 g of ammonium molybdate tetrahydrate (Strem Chemicals) in an aqueous solution of $H_3PO_4$ 0.5 N (32 mL). 12.0 g of Y—Al were then rapidly added to solution A under vigorous stirring. The suspension was left to settle at room temperature for 4 hours. Solution B which was obtained by dissolution of 0.6 g of cerium nitrate hexahydrate (Strem Chemicals) in 4 mL of distilled water, was added under vigorous stirring. The obtained suspension which had a yellow-orange color, was then slowly evaporated to dryness at 60-70° C. The resulting solid was then dried overnight at 120° C. and finally activated in air at 550° C. for 3 hours. 10.0 g of the previously obtained solid were intimately mixed with 1.8 g of bentonite clay and then extruded with water. The resulting extrudates were dried overnight at 120° C. and finally activated in air at 750° C. for 3 hours.

EXAMPLE 13

Catalyst DC 27/503 HYB

1) The main component, herein named COMP 010, was prepared by first dissolving 2.6 g of ammonium molybdate tetrahydrate in an aqueous solution of $H_3PO_4$ (50 mL). The obtained solution was rapidly added to 20.0 g of Y—Al. The suspension was left to settle at room temperature for 4 hours. After evaporation to dryness at 60-70° C. and further drying overnight at 120° C., the solid was finally activated in air at 550° C. for 3 hours.

2) The co-component, herein named COMP 003, was prepared by first dissolving 2.5 g of cerium nitrate hexahydrate (Strem Chemicals) in 50 mL of distilled water. The obtained solution was rapidly added to 20.0 g of Y—Al under vigorous stirring. After a few minutes the suspension was evaporated to dryness at 60-70 ° C., then dried overnight at 120° C. and finally activated in air at 550° C. for 3 hours.

3) The final catalyst—DC 27 (503) hyb— was obtained by : first extrusion of the solid mixture of 7.2 g of COMP 010, 2.4 g of COMP 003 and 2.4 g of bentonite, then drying the resulting extrudates overnight at 120° C. and finally activating them in air at 750° C. for 3 hours.

2. Catalyst Testing and Results

Table 1 reports the catalytic data obtained with monocomponent and hybrid catalysts, using the "dual" reactor configuration (fixed-bed technology with two reaction zones). Two feeds were used: light naphtha and heavy naphtha (S content<0.1 ppm), both provided by Ultramar Canada. For each catalyst, the two numbers of reaction temperature given in Tables 1, 2 and 3, represent the temperature of the catalytic bed and the pre-catalytic zone (thermal cracking alone), respectively.

The data depicted in Table 1, more specifically columns 1-4, representing runs performed with light naphtha using the "dual" reactor configuration, illustrates the superiority of the catalysts of the present invention when compared to current steam cracking (see Table 2, column 1). More specifically, the catalysts provide a higher combined yield of ethylene and propylene; a lower production of methane (a greenhouse gas); a lower production of hydrocarbons having a boiling point higher than 330° C. (commercially of extremely low value); and they operate at lower temperatures (energy saving).

The "dual" reactor configuration allows for the use of relatively low reaction temperatures in the catalyst bed. Low reaction temperatures are particularly suitable for hybrid catalysts comprising "fragile" acidic zeolite- or alumina-based materials. However, this configuration also raises some technological challenges since it requires a pre-catalytic zone in which a mild thermal cracking occurs. The pre-catalytic zone requires reaction temperatures significantly higher than those used in the catalyst bed. This implies that a third zone, sandwiched between the pre-catalytic zone and the catalyst bed, acts as a cooling zone.

Surprisingly, the catalysts of the present invention have a sufficiently high thermal (and steam atmosphere) resistance, enabling them to be used at significantly higher temperatures. At temperatures exceeding 700° C. thermal cracking becomes effective. In fact, with the use of the catalysts of the present invention, there is no need for the use of a separate pre-catalytic zone.

Table 2 illustrates the activity and selectivity of the DC-25/6 catalyst (columns 4,5,7,8), as obtained with light and heavy naphthas, and using a "mono" reactor configuration. This catalytic performance is similar to that obtained with catalyst DC-25/3 operating in "dual" reactor mode (Table 2, columns 3 and 6). Furthermore, this catalytic performance is superior to the results obtained with the current steam-cracking technology (Table 2, columns 1 and 2).

The use of heavier feeds (gas oils from Ultramar, S content<1.0 ppm), as tested with the "mono" reactor configuration, confirms the advantageous behavior of the catalysts of the present invention (Table 3, columns 4 and 5).

As can be observed from the results illustrated in Table 2 (columns 4, 5, 7 and 8) and Table 3 (columns 4 and 5), a judicious balance between the reaction temperature and the residence time can provide great flexibility in terms of the production of ethylene and propylene (i.e. the ethylene/propylene ratio can be significantly changed without affecting the combined overall ethylene—propylene yield).

Since the catalysts of the present invention can be used with a "mono" reactor configuration (i.e. normal catalyst-bed technology) while maintaining the advantages of the catalysts tested in a "dual" reactor configuration (i.e. two sequential reaction zones), significantly simplifies production plant technology. More specifically, the catalysts of the present invention can be used in both a fixed-bed reactor or in a fluidized-bed reactor. Furthermore, the low temperatures used in the thermo-catalytic cracking (TCC) process of the present invention ("mono" reactor configuration) would allow for the processing of any residual (petroleum) fractions, even in tubular heaters, which would otherwise (i.e. current steam-cracking technology) undergo excessive coke formation [S. Raseev, in "Thermal and Catalytic Processes in Petroleum Refining", Marcel Dekker Inc., New York (2003), p193].

Surprisingly, the incorporation of mineral acids such as for example phosphoric, sulfuric or hydrochloric acid, in moderate concentrations during the preparation of the mesoporous mixed oxides, improves the catalyst's activity. More precisely, the combined production of olefins, particularly ethylene and propylene, and diolefines is enhanced. As can be observed from the results depicted in Table 4, the yields of olefinic products obtained at 740° C. with the acid doped mixed oxide catalysts DC 27/6, DC 27/7, DC 27/9, DC 27/10 and DC 27/13 were significantly higher than those obtained with the undoped mixed oxide catalyst DC 25/6 tested at 740-750° C. (Table 3), notwithstanding the fact that some of the reaction conditions experienced by the former catalysts (i.e. Weight Hourly Space Velocity [W.H.S.V.], residence time and steam/oil ratio) were harsher. It is worth noting that even though the production of olefins was significantly higher, the production of methane remained essentially stable (Table 4 versus Table 3). Phosphoric and hydrochloric acid are most preferred and provide better overall catalytic performances than sulfuric acid, these acids being used in the preparation of catalysts in aqueous solutions of identical normality.

Finally, experimental data obtained with catalyst DC 27/7 using Syncrude heavy gas oil as feed, is illustrated in Table 4 (column 8). The latter gas oil, which is extracted from bituminous sands (Alberta, Canada), even treated, contains substantial amounts of sulfur (2120 ppm) and nitrogen (1440 ppm). Nonetheless, under these conditions, the DC 27/7 catalyst exhibits good on-stream stability and high performance.

TABLE 1

PROCESS PERFORMANCES IN THE CRACKING OF (Ultramar) NAPHTHAS (dual reactor configuration)

| | Run number | | | | | |
|---|---|---|---|---|---|---|
| | 1 | 2 | 3 | 4 | 5 | 6 |
| Naphtha | Light | light | light | light | heavy | heavy |
| Density (g/mL) | | 0.66 | | | 0.75 | |
| (bp range, ° C.) | | (35-60) | | | (35-240) | |
| Catalyst of the invention | DC-25/1 | DC-25/2 | DC-25/3 | DC-25/5 | DC-25/4 | DC-25/5 |
| Reaction temp. (° C.) | 700/755 | 650/760 | 650/750 | 680/755 | 680/755 | 680/750 |
| See examples 1-5 | | | | | | |
| W.H.S.V. ($h^{-1}$) | 1.3 | 1.3 | 1.3 | 1.3 | 1.3 | 1.3 |
| Steam/naphtha | 0.8 | 0.8 | 0.8 | 0.8 | 0.8 | 0.8 |
| Product distribution (wt %) | | | | | | |
| $C_2^=$ | 28.5 | 30.3 | 28.3 | 27.8 | 28.4 | 26.8 |
| $C_3^=$ | 20.5 | 19.4 | 22.7 | 20.4 | 17.3 | 17.6 |
| $C_4^=$ | 6.0 | 8.9 | 10.0 | 8.9 | 5.6 | 6.2 |
| Butadienes | 2.8 | 2.8 | 2.6 | 2.5 | 3.1 | 3.3 |
| BTX aromatics | 12.3 | 9.3 | 7.7 | 10.0 | 17.7 | 17.8 |
| Heavy hyd. (>330° C.) | 0.0 | 0.8 | 0.8 | 1.0 | 0.1 | 0.0 |
| Methane | 10.2 | 10.1 | 9.1 | 10.4 | 11.0 | 10.5 |
| Combined yield (ethylene + propylene) | 49.0 | 49.7 | 51.0 | 48.2 | 45.7 | 44.4 |
| propylene/ethylene ratio | 0.72 | 0.64 | 0.80 | 0.73 | 0.61 | 0.65 |
| ($C_2^=$-$C_4^=$) + butadienes | 57.8 | 62.3 | 63.9 | 59.6 | 54.4 | 53.8 |

TABLE 2

PROCESS PERFORMANCES IN THE CRACKING OF NAPHTHAS

| | PROCESS NAME | | | | | | | |
|---|---|---|---|---|---|---|---|---|
| | SC | | TCC | | | TCC | | |
| | Column number | | | | | | | |
| | 1 | 2 | 3 | 4 | 5 | 6 | 7 | 8 |
| Naphtha | light (IFP) | Light (Kuwait) | light (Ultramar) | | | heavy (Ultramar) | | |
| Density (g/mL) | 0.66 | 0.71 | 0.66 | | | 0.75 | | |
| (bp range, ° C.) | (35-160) | (30-170) | (35-160) | | | (35-240) | | |
| Reaction mode | mono | Mono | dual | mono | | dual | mono | |
| Catalyst used | none | None | DC25/3 | DC-25/6 | | DC-25/3 | DC-25/6 | |
| See Examples 3 and 6 | | | | | | | | |
| Reaction Temp. (° C.) | 835-855 | 835-850 (high severity) | 640/760 | 760 | 750 | 640/750 | 760 | 750 |
| App. Res. Time (s) | 0.5 | 0.5 | 2 | 0.7 | 2 | 2 | 0.7 | 2 |
| W.H.S.V. ($h^{-1}$) | n.a. | n.a. | 1.3 | 1.3 | 1.3 | 1.3 | 1.3 | 1.3 |
| Steam/naphtha | 0.6 | 0.6 | 0.8 | 0.8 | 0.8 | 0.8 | 0.8 | 0.8 |
| Product distribution (wt %) | | | | | | | | |
| $C_2^=$ | 27.1 | 31.3 | 31.9 | 29.4 | 35.3 | 27.1 | 27.5 | 31.7 |
| $C_3^=$ | 16.3 | 12.1 | 21.0 | 21.6 | 18.1 | 18.9 | 18.1 | 14.3 |
| $C_4^=$ | 5.9 | 2.8 | 5.6 | 8.5 | 4.3 | 4.9 | 5.9 | 3.4 |
| Butadienes | 4.2 | 4.2 | 3.0 | 3.6 | 3.1 | 3.1 | 4.4 | 3.2 |
| BTX aromatics | 12 | 13.0 | 12.0 | 7.0 | 12.1 | 18.9 | 15.0 | 18.0 |
| Heavy hyd. (>330° C.) | 5 | 6.0 | <1 | 0.1 | 0.2 | 2.0 | 0.1 | 0.3 |
| Methane | 15.7 | 15.0 | 9.6 | 11.5 | 13.7 | 10.3 | 9.1 | 13.8 |

TABLE 2-continued

PROCESS PERFORMANCES IN THE CRACKING OF NAPHTHAS

| | PROCESS NAME | | | | | | | |
|---|---|---|---|---|---|---|---|---|
| | SC | | TCC | | | TCC | | |
| | Column number | | | | | | | |
| | 1 | 2 | 3 | 4 | 5 | 6 | 7 | 8 |
| Combined yield (ethylene + propylene) | 43.4 | 43.4 | 52.9 | 51.0 | 53.4 | 46.0 | 45.6 | 46.0 |
| propylene/ethylene ratio | 0.60 | 0.39 | 0.66 | 0.74 | 0.51 | 0.70 | 0.66 | 0.45 |
| $C_2^=$-$C_4^=$+ butadienes | 53.5 | 50.4 | 61.5 | 63.1 | 60.8 | 54.0 | 55.9 | 52.6 |

SC: steam-cracking (current technology)
TCC: thermo-catalytic cracking - formerly called selective deep catalytic cracking (Concordia, Canada)
n.a. = not applicable

TABLE 3

PROCESS PERFORMANCES IN THE CRACKING OF GAS OILS

| | PROCESS NAME | | | | |
|---|---|---|---|---|---|
| | SC | DCC | TCC | | |
| | Column number | | | | |
| | 1 | 2 | 3 | 4 | 5 |
| Gas Oil | Kuwait | Daqing (vacuum) | Ultramar | | |
| Density (g/mL) | 0.83 | 0.84 | 0.854 | | |
| (bp range, °C.) | (230-330) | (n.a.) | (240-400) | | |
| Reaction mode | mono | mono | dual | mono | |
| Catalyst used See examples 3 and 6 | none | zeolite | DC-25/3 | DC-25/6 | |
| Reaction temp. (° C.) | 840 (high severity) | 560 | 650/750 | 750 | 740 |
| App. Res. Time (s) | 0.5 | 2 | 2 | 0.7 | 2 |
| W.H.S.V. (h$^{-1}$) | n.a. | 2.0 | 1.2 | 1.2 | 1.2 |
| Steam/oil | n.A. | 0.3 | 1.1 | 1.1 | 1.1 |
| Product distribution (wt %) | | | | | |
| $C_2^=$ | 26.0 | 5.7 | 26.5 | 23.4 | 26.5 |
| $C_3^=$ | 9.0 | 20.4 | 15.7 | 18.2 | 14.6 |
| $C_4^=$ | 2.0 | 15.7 | 4.1 | 5.6 | 3.3 |
| Butadienes | 4.2 | — | 2.1 | 3.9 | 2.9 |
| BTX aromatics | 12.6 | ? | 19.6 | 11.7 | 14.6 |
| Heavy hyd. (>330° C.) | >7 | 7.3 | 4.8 | 2.4 | 0.5 |
| Methane | 13.7 | 12.6 | 10.0 | 10.7 | 12.2 |
| Combined yield (ethylene + propylene) | 35.0 | 26.1 | 42.2 | 41.6 | 41.1 |
| propylene/ethylene ratio | 0.35 | 3.57 | 0.59 | 0.78 | 0.55 |
| ($C_2^=$-$C_4^=$) + butadienes | 41.2 | 41.8 | 48.4 | 51.1 | 47.3 |

SC: steam-cracking (current technology)
DCC: deep catalytic cracking (China)
TCC: thermo-catalytic cracking - formerly called selective deep catalytic cracking (Concordia, Canada)
n.a. = not applicable
n.A. = not available (0.8-1.0)

TABLE 4

PERFORMANCE OF THE TCC CATALYSTS TESTED ON ULTRAMAR GAS OIL (columns 1-7, density = 0.854 g/ml; bp range = 240-400° C.) and SYNCRUDE HEAVY GAS OIL (column 8, density = 0.923 g/ml; bp range = 200-570° C.); reaction mode = monoreactor; Approximate residence time = 0.5 s; W.H.S.V. = 1.4 h$^{-1}$; steam/oil = 1.0].

| | Column number | | | | | | | |
|---|---|---|---|---|---|---|---|---|
| | 1 | 2 | 3 | 4 | 5 | 6 | 7 | 8 |
| DC- Catalyst used See examples 6, 7, 9, 10, 13 | 27/7 | 27/7 | 27/7 | 27/6 | 27/9 | 27/10 | 27/13 | 27/7 |
| Reaction temp. (° C.) | 720 | 730 | 740 | 740 | 740 | 740 | 740 | 740 |
| Product distribution (wt %) | | | | | | | | |
| $C_2^=$ | 18.9 | 22.3 | 24.7 | 23.9 | 22.1 | 22.3 | 23.0 | 19.2 |
| $C_3^=$ | 18.4 | 19.5 | 19.9 | 18.9 | 18.8 | 19.2 | 19.8 | 16.5 |
| $C_4^=$ | 6.8 | 6.3 | 5.9 | 6.0 | 6.1 | 6.2 | 6.5 | 5.5 |

TABLE 4-continued

PERFORMANCE OF THE TCC CATALYSTS TESTED ON ULTRAMAR GAS OIL (columns 1-7, density = 0.854 g/ml; bp range = 240-400° C.) and SYNCRUDE HEAVY GAS OIL (column 8, density = 0.923 g/ml; bp range = 200-570° C.); reaction mode = monoreactor; Approximate residence time = 0.5 s; W.H.S.V. = 1.4 h$^{-1}$; steam/oil = 1.0].

| | Column number | | | | | | | |
|---|---|---|---|---|---|---|---|---|
| | 1 | 2 | 3 | 4 | 5 | 6 | 7 | 8 |
| Butadienes | 3.4 | 3.6 | 3.7 | 3.3 | 3.6 | 3.6 | 3.8 | 3.0 |
| BTX aromatics | 19.4 | 13.6 | 12.7 | 18.3 | 13.1 | 17.9 | 15.5 | 18.0 |
| Heavy hyd. (>330° C.) | 0.0 | 2.4 | 1.8 | 0.7 | 2.4 | 0.2 | 0.2 | 1.7 |
| Methane | 11.1 | 11.3 | 12.6 | 13.4 | 12.7 | 12.2 | 12.3 | 12.0 |
| Combined yield (ethylene + propylene) | 37.3 | 41.8 | 44.6 | 42.8 | 40.8 | 41.5 | 42.8 | 35.7 |
| propylene/ethylene ratio | 0.97 | 0.87 | 0.81 | 0.79 | 0.85 | 0.86 | 0.86 | 0.86 |
| $(C_2^=-C_4^=)$ + butadienes | 47.4 | 51.8 | 54.2 | 52.1 | 50.5 | 51.2 | 53.1 | 44.2 |

Table 5 reports the performance of the TCC catalysts which contained $CeO_2$ and yttria-stabilized aerogel alumina (Examples 12 and 13). While the combined yield of ethylene and propylene was excellent when compared to the other TCC catalysts of the present invention, catalysts DC 27/304b and DC 27/503hyb did not produce any heavy hydrocarbons, and in addition produced much lower methane, BTX aromatics and polynuclear aromatics. The decreased production of aromatics and the increased formation of olefins could be ascribed to the presence of cerium species on the catalyst surface.

TABLE 5

Performance of the TCC catalysts tested on a heavy atmospheric gas oil (density 0.860 g/ml; bp range = 175-400° C., S content < 0.1 ppm)

| Catalyst | DC 27/304b | DC 27/503 hyb |
|---|---|---|
| Reaction temp. (° C) | 740 | 740 |
| Product distribution (wt %) | | |
| $C_2^=$ | 23.7 | 21.9 |
| $C_3^=$ | 22.1 | 18.7 |
| $C_4^=$ | 7.5 | 6.7 |
| Butadienes | 4.7 | 4.3 |
| BTX aromatics | 10.0 | 12.2 |
| Heavy hyd. (>330° C.) | -nil- | -nil- |
| Methane | 8.1 | 9.7 |
| Combined yield (ethylene + propylene) | 45.8 | 40.6 |
| propylene/ethylene | 0.93 | 0.85 |
| $(C_2^=-C_4^=)$ + butadienes | | |

Although the present invention has been described hereinabove by way of preferred embodiments thereof, it can be modified without departing from the spirit and nature of the subject invention as defined in the appended claims.

REFERENCES

1. S. Raseev, in "Thermal and Catalytic Processes in Petroleum Refining", Marcel Dekker Inc., New York (2003), p137-274.
2. R. Le Van Mao, U.S. Pat. No. 4,732,881 (22 Mar. 1988).
3. R. Le Van Mao, S. Melancon, C. Gauthier-Campbell and P. Kletnieks, Catal. Lett. 73 (2/4) (2001) 181.
4. R. Le Van Mao, PCT/CA00/01327, (WO0132806), Int. filing date: Mar. 11, 2000.
5. R. Le Van Mao, PCT/CA01/01107, (WO 02/10313), Int. filing date: Jul. 27, 2007.
6. S. Melancon, R. Le Van Mao, P. Klenieks, D. Ohayon, S. Intem, M. A. Saberi, and D. McCann, Catal. Lett. 80 (3/4), (2002), 103.
7. R. Le Van Mao, PCT/CA03/00105 (WO03064039), Int. filing date: Jan. 27, 2003.
8. R. Le Van Mao, N. T. C. Vo, B. Sjiariel, L. Lee and G. Denes, J. Mater. Chem. 2 (6), (1992), 595.
9. S. Xiao, R. Le Van Mao and G. Denes, J. Mater. Chem. 5(8), (1995), 1251.

The invention claimed is:

1. A catalyst for use in thermo-catalytic cracking of hydrocarbon feedstocks to selectively produce light olefins, said catalyst comprising mesoporous mixed oxides modified by the presence of inorganic compounds containing chemical elements selected from phosphorus, sulfur, chlorine and mixtures thereof, said mesoporous mixed oxides comprising molybdenum oxide or tungsten oxide, or a combination thereof, said catalyst being supported on yttria stabilized zirconium oxide and/or yttria stabilized aluminum oxide.

2. The catalyst of claim 1, wherein the mesoporous mixed oxides further comprise either lanthanum oxide or cerium oxide, or both.

3. The catalyst of claim 2, in accordance with the following formula:

(a) $MoO_3$ and/or $WO_3$; (b) $La_2O_3$; (c) $CeO_2$; (d) P, S or Cl; (e) $ZrO_2$ and/or $Al_2O_3$; (f) $Y_2O_3$.

4. The catalyst of claim 1, comprising or further comprising:

(a) $MoO_3$ and/or $WO_3$: 3.0 to 15.0 wt %;
(b) $La_2O_3$: 0.0 to 7.0 wt %;
(c) $CeO_2$: 0.0 to 3.0 wt %;
(d) P, S or Cl: 0.0 to 2.0 wt %;
(e) $ZrO_2$ and/or $Al_2O_3$: 70.0 to 90.0 wt %; and
(f) $Y_2O_3$: 3.0 to 20 wt %.

5. The catalyst of claim 1, said catalyst being supported on yttria stabilized aluminum oxide.

6. The catalyst of claim 3 wherein component (e) is $Al_2O_3$.

7. The catalyst of claim 4 wherein component (e) is $Al_2O_3$.

8. The catalyst of claim 1 further comprising a binder.

9. The catalyst of claim 3 further comprising a binder.

10. The catalyst of claim 4 further comprising a binder.

11. The catalyst of claim 10 wherein the binder is bentonite clay.

12. The catalyst of claim 1 further comprising a component selected from an acidic crystalline zeolite, an acidic silica molecular sieve and an acidic alumina.

13. The catalyst of claim 3 further comprising a component selected from an acidic crystalline zeolite, an acidic silica molecular sieve and an acidic alumina.

14. The catalyst of claim 4 further comprising a component selected from an acidic crystalline zeolite, an acidic silica molecular sieve and an acidic alumina.

15. The catalyst of claim 5 further comprising a component selected from an acidic crystalline zeolite, an acidic silica molecular sieve and an acidic alumina.

16. The catalyst of claim 8 further comprising a component selected from an acidic crystalline zeolite, an acidic silica molecular sieve and an acidic alumina.

17. The catalyst of claim 16 wherein the binder is bentonite clay.

18. The catalyst of claim 1, wherein the mesoporous mixed oxides comprise molybdenum oxide and tungsten oxide.

19. The catalyst of claim 1, wherein the mesoporous mixed oxides comprise molybdenum oxide or tungsten oxide.

20. The catalyst of claim 2, wherein the mesoporous mixed oxides comprise molybdenum oxide and either lanthanum oxide or cerium oxide, or both.

21. The catalyst of claim 2, wherein the mesoporous mixed oxides comprise tungsten oxide and either lanthanum oxide or cerium oxide, or both.

22. A method of making the catalyst of claim 1, comprising:
   (a) combining said mesoporous mixed oxides modified by the presence of inorganic compounds containing chemical elements selected from phosphorus, sulfur, chlorine and mixtures thereof in the form of liquid solutions or suspensions;
   (b) mixing said solutions or suspensions with solid particulate or powder forms of yttria stabilized zirconium oxide and/or yttria stabilized aluminum oxide to obtain an extrudable paste;
   (c) extruding said paste; and
   (d) drying and activating the extrudate thereby providing a finished catalyst in solid form.

23. A method of making the catalyst of claim 12, comprising:
   (a) combining said mesoporous mixed oxides modified by the presence of inorganic compounds containing chemical elements selected from phosphorus, sulfur, chlorine and mixtures thereof in the form of liquid solutions or suspensions;
   (b) mixing said solutions or suspensions with solid particulate or powder forms of yttria stabilized zirconium oxide and/or yttria stabilized aluminum oxide and further mixing with a binder to obtain an extrudable paste;
   (c) extruding said paste; and
   (d) drying and activating the extradute thereby providing a finished catalyst in solid form.

24. A method of making the catalyst of claim 12, comprising:
   (a) combining said mesoporous mixed oxides modified by the presence of inorganic compounds containing chemical elements selected from phosphorus, sulfur, chlorine and mixtures thereof in the form of liquid solutions or suspensions;
   (b) mixing said solutions or suspensions with solid particulate or powder forms of yttria stabilized zirconium oxide and/or yttria stabilized aluminum oxide, optionally with a binder, to obtain an extrudable paste;
   (c) extruding said paste;
   (d) drying the extrudate and optionally activating the dried extrudate;
   (e) mixing the dried extrudate with a further a binder and a further component selected from an acidic crystalline zeolite, an acidic silica molecular sieve and an acidic alumina to obtain a homogeneous mixture;
   (f) extruding said mixture to yield a solid catalyst; and
   (g) drying and activating said catalyst.

25. A method of making the catalyst of claim 12, comprising:
   (a) combining said mesoporous mixed oxides with the exception of cerium oxides, said mesoporous mixed oxides being modified by the presence of inorganic compounds containing chemical elements selected from phosphorus, sulfur, chlorine and mixtures thereof in the form of liquid solutions or suspensions;
   (b) mixing said solutions or suspensions with solid particulate or powder forms of yttria stabilized zirconium oxide and/or yttria stabilized aluminum oxide;
   (c) mixing the material obtained in step (b) with a solution or suspension containing cerium oxide, optionally with a binder;
   (d) drying and activating the material obtained from step (c);
   (e) mixing the activated material from step (d) with a binder;
   (f) extruding the material of step (e) to yield a solid catalyst; and
   (g) drying and activating said catalyst.

26. A method of making the catalyst of claim 12, comprising:
   (a) combining said mesoporous mixed oxides with the exception of cerium oxides, said mesoporous mixed oxides being modified by the presence of inorganic compounds containing chemical elements selected from phosphorus, sulfur, chlorine and mixtures thereof in the form of liquid solutions or suspensions;
   (b) mixing said solutions or suspensions with solid particulate or powder forms of yttria stabilized zirconium oxide and/or yttria stabilized aluminum oxide;
   (c) drying and activating the mixture obtained in step (b);
   (d) preparing a solution or suspension containing cerium oxide mixing said solutions or suspensions with solid particulate or powder forms of yttria stabilized zirconium oxide and/or yttria stabilized aluminum oxide;
   (e) drying and activating the mixture obtained in step (d);
   (f) mixing the dried and activated material obtained from steps (c) and (e) together with a binder;
   (g) extruding the material of step (e) to yield a solid catalyst; and
   (h) drying and activating said catalyst.

27. The method of claim 22 wherein all activations are performed in air at about 550 to about 750° C.

28. The method of claim 23 wherein all activations are performed in air at about 550 to about 750° C.

29. The method of claim 24 wherein all activations are performed in air at about 550 to about 750° C.

30. The method of claim 25 wherein all activations are performed in air at about 550 to about 750° C.

31. The method of claim 26 wherein all activations are performed in air at about 550 to about 750° C.

* * * * *